March 20, 1928.
C. T. PFLUEGER
1,662,983
HOOK HOLDER FOR FISHING RODS
Filed Aug. 11, 1926
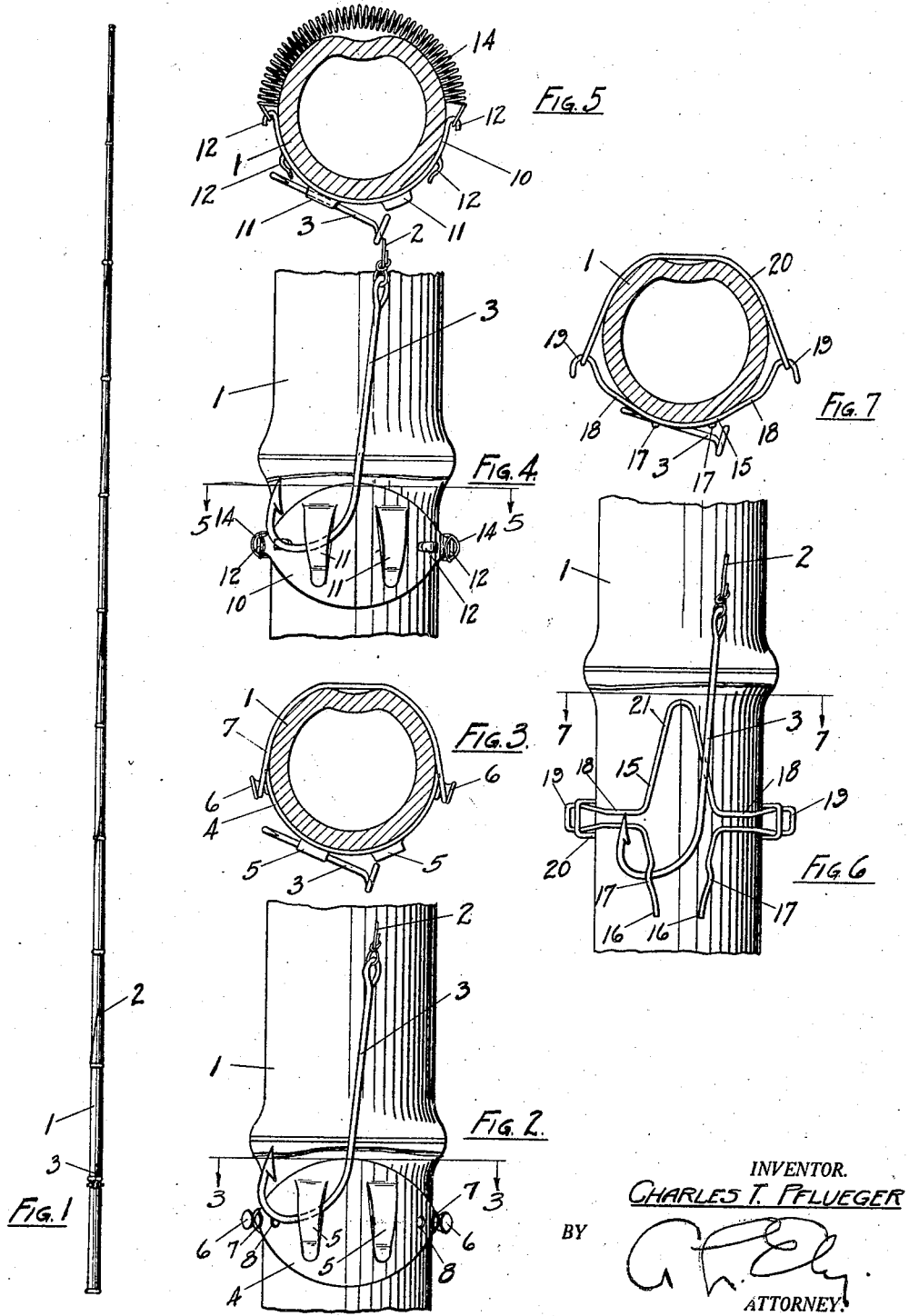
INVENTOR.
CHARLES T. PFLUEGER
BY
ATTORNEY Patented Mar. 20, 1928.

1,662,983

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

HOOK HOLDER FOR FISHING RODS.

Application filed August 11, 1926. Serial No. 128,566.

The purpose of the present invention is to design and construct a new and improved attachment for fishing rods by which the hooks may be held in position against the rod. It is customary, in carrying rods of the type illustrated, to wrap the line about the rod and provide some means for fastening the hook to the rod so that it will not swing therefrom and so that the line may be kept in its wrapped condition.

A number of devices have been designed heretofore for the purpose of holding the hook in position, but these have been too expensive to afford a ready sale, or not easily adjustable for different diameters of rods. The object of the invention is, therefore, to design a cheap, easily manufactured and simple holder for this purpose which can sell for a few cents and will be adaptable for rods of varying diameters.

In the drawings are shown several forms of the invention, it being understood that other forms may be devised as well, the invention not being limited to exact conformity with the showing and description herein.

In the drawings:

Figure 1 is a view of a pole with the line wrapped about it and the hook holder in position;

Figure 2 is an enlarged view of the hook holder, showing the preferred form of the invention;

Figure 3 is a section on the line 3—3 of Figure 2;

Figure 4 is a modified form;

Figure 5 is a section on the line 5—5 of Figure 4;

Figure 6 is a further modification; and

Figure 7 is a section on the line 7—7 of Figure 6.

The numeral 1 represents the fishing rod which, as shown, is of the usual bamboo pole type. The line is represented at 2 and the hook at 3. The holder comprises an arc-shaped plate 4 which is of a curvature to fit substantially all diameters of poles, at the center of which are struck up two spring prongs or catches 5, the central portions of which are arched upwardly slightly to provide seats or pockets for the hooks and the tips bent upwardly for easy insertion of the hook.

At the ends of the plate are provided two studs or rivets 6 which afford anchorage for a contractile holding element 7 which, in the form shown in this figure, is an ordinary rubber band, this being preferable as a rubber band can be easily obtained and, furthermore, can be adjusted to suit any diameter of pole by taking one or more twists in the band about the studs. Small eyelets 8 can be provided in the plate for the insertion of tacks or other permanent fastening means if such are desired by the fisherman.

In the form of the invention shown in Figures 4 and 5, the plate 10, which has the same keepers 11 formed thereon, is provided with pairs of upwardly turned hooks 12 to which the ends of a spiral spring 14 are fastened. The hooks permit of a certain degree of adjustment for the spring to accommodate poles of different diameters.

In place of the plate of either prior form, a bent wire hook retainer may be substituted. This is shown in Figures 6 and 7, in which a single piece of wire 15 is formed with two projecting ends 16 which are formed with humps 17 to receive the hooks. At the sides the wire is formed with two lateral arms 18, the ends of which are bent outwardly to provide hooks 19 for the reception of the rubber band 20. A centrally located, upwardly extending arm 21 is provided, which keeps the holder flat against the side of the pole. The whole device is arched to fit about the pole.

What is claimed is:

1. A fish hook holder for application to a fishing rod, comprising an arched plate, a prong stamped from said plate and adapted to receive a hook, and a contractile element attached to the ends of the plate and surrounding the pole.

2. A fish hook holder for application to a fishing rod, comprising an arched metallic holder having a pocket therein for the retention of a fish hook, and a contractile member attached to the ends of the member and surrounding the pole.

3. A fish hook holder for application to a fishing rod, comprising an arched plate, a prong stamped up from said plate and having a pocket therein for the retention of a fish hook, studs at the ends of the plate, and a rubber band received over the studs and surrounding the pole.

CHARLES T. PFLUEGER.